United States Patent [19]

Dames

[11] Patent Number: 4,940,519

[45] Date of Patent: Jul. 10, 1990

[54] DETOXIFICATION APPARATUS AND METHOD FOR TOXIC WASTE USING LASER ENERGY AND ELECTROLYSIS

[76] Inventor: Robert G. Dames, 4444 Green Valley Dr., Arnold, Mo. 63010

[21] Appl. No.: 211,767

[22] Filed: Jun. 27, 1988

[51] Int. Cl.⁵ ............................ C02F 1/461; C02F 1/30
[52] U.S. Cl. ..................................... 204/130; 204/131; 204/157.15; 204/242; 204/275; 110/238; 110/346; 210/748; 219/121.6; 219/121.84; 219/121.85
[58] Field of Search ............... 110/237, 238, 250, 346; 219/121.6, 121.74, 121.76, 121.84, 121.85; 204/131, 157.15, 275, 130, 157.41, 157.61

[56] References Cited

U.S. PATENT DOCUMENTS

| | | | |
|---|---|---|---|
| 3,458,140 | 7/1969 | Schryver | 219/121.6 |
| 3,719,454 | 3/1973 | Shang | 219/121.6 |
| 3,808,672 | 5/1974 | Castro et al. | 219/121.84 |
| 4,012,301 | 3/1977 | Rich | 204/157.41 |
| 4,076,515 | 2/1978 | Rickard | 71/10 |
| 4,230,546 | 10/1980 | Ronn | 204/157.41 |
| 4,246,255 | 1/1981 | Grantham | 423/659 |
| 4,341,738 | 7/1982 | Kemmler | 422/184 |
| 4,351,978 | 9/1982 | Hatano | 585/469 |
| 4,367,130 | 1/1983 | Lemelson | 204/157.42 |
| 4,397,823 | 8/1983 | Dimpfl | 423/210 |
| 4,425,856 | 1/1984 | Szilagyi | 110/238 |
| 4,475,650 | 10/1985 | Arditty et al. | 219/121.74 |
| 4,481,891 | 11/1984 | Takeshita et al. | 110/238 |
| 4,529,489 | 7/1985 | McDonald | 204/157.15 |
| 4,549,966 | 10/1985 | Beall | 210/661 |
| 4,585,533 | 4/1986 | Habeeb | 204/149 |
| 4,672,169 | 6/1987 | Chambers | 219/121.16 |
| 4,702,804 | 10/1987 | Mazur et al. | 204/131 |

*Primary Examiner*—John F. Niebling
*Assistant Examiner*—David G. Ryser
*Attorney, Agent, or Firm*—Polster, Polster and Lucchesi

[57] ABSTRACT

Detoxification apparatus (1) for disposing of toxic waste material by incineration includes a closed reactive vessel (3) having an inlet (5) and an outlet (7). Waste material is introduced into the vessel in a fluid state and a laser (19) produces a high energy laser beam within the vessel. The waste material passes through the beam and the beam energy creates very high temperatures within the material that incinerates the toxic waste. The detoxified material is removed from the vessel for further processing.

16 Claims, 5 Drawing Sheets

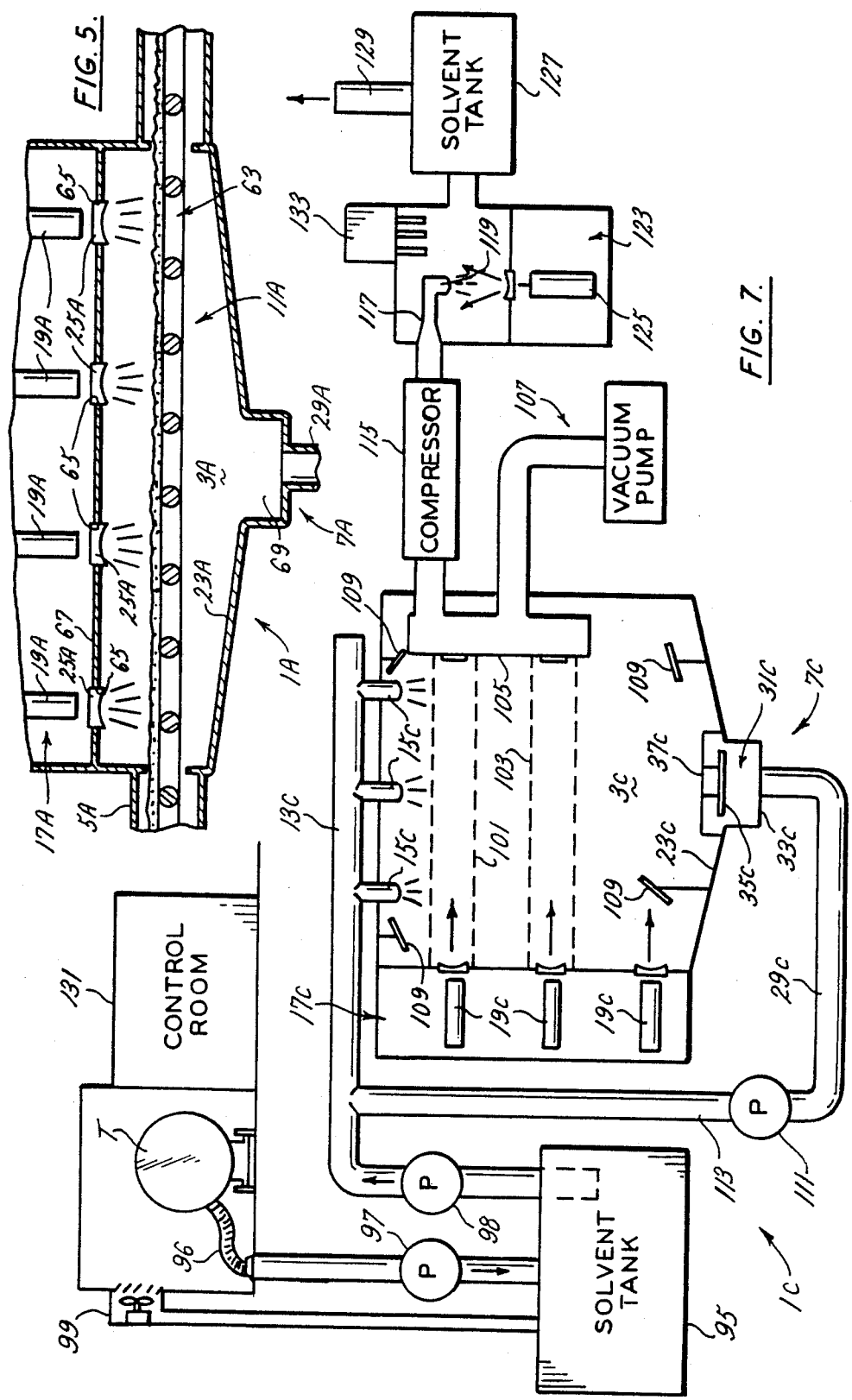

DETOXIFICATION APPARATUS AND METHOD FOR TOXIC WASTE USING LASER ENERGY AND ELECTROLYSIS

BACKGROUND OF THE INVENTION

This invention relates to waste disposal and, more particularly, to apparatus and method for safely disposing of toxic waste material such as polychlorinated biphenyls (PCB's).

Recent public and governmental concern over environmental pollution has focused intense pressure on industry to develop safe disposal techniques for toxic wastes which endanger the air we breathe, the soil we grow things in, the plants and animal life with which we are surrounded, as well as ourselves. The continued growth of our economy means that, for the time being at least, large amounts of toxic waste will continue to be produced and need to be disposed of. Of the current disposal methods, landfills, for example, are rapidly being filled and fewer new landfills are opening up. In addition, not all waste can be disposed of in them. With respect to certain of the more toxic wastes such as PCB's and dioxin, the safest disposal method is burning or incineration. Yet, the large combustion furnaces currently available for use are very expensive, not only because of their size, but also because of the environmental safe-guards which must be built into them. Consequently, they are few in number and there is vociferous opposition to building new ones in various areas as well as transporting contaminated materials from remote sites to them. And yet, failure to provide available disposal facilities may mean more sites like Love Canal in New York State or Times Beach, in Missouri will develop.

The present apparatus solves those and other problems in a manner not revealed by the known prior art.

SUMMARY OF THE INVENTION

Among the several aspects of the present invention may be noted the provision of apparatus and a method for the disposal of toxic waste such as PCB, and the provision of such apparatus and method for the safe disposition of molecular (organic) wastes by very high temperature incineration of the waste material in a reactive vessel by the application of an intense laser beam onto the waste material. Another aspect of this invention is the provision of such apparatus and method which is of relatively low cost and can be readily constructed at sites near toxic waste sources.

Yet another aspect of this invention is the provision of such apparatus and method which is controlled and monitored to insure complete disposal of toxic wastes; and, the provision of such apparatus and method to produce end products which can be exhausted into the atmosphere.

BRIEF DESCRIPTION OF THE DRAWINGS

FIG. 5 is a schematic representation of a fourth possible construction of the apparatus using a conveyor;

Corresponding reference character indicate corresponding parts throughout the several view of the drawings.

DESCRIPTION OF PREFERRED EMBODIMENTS

Figure 1:
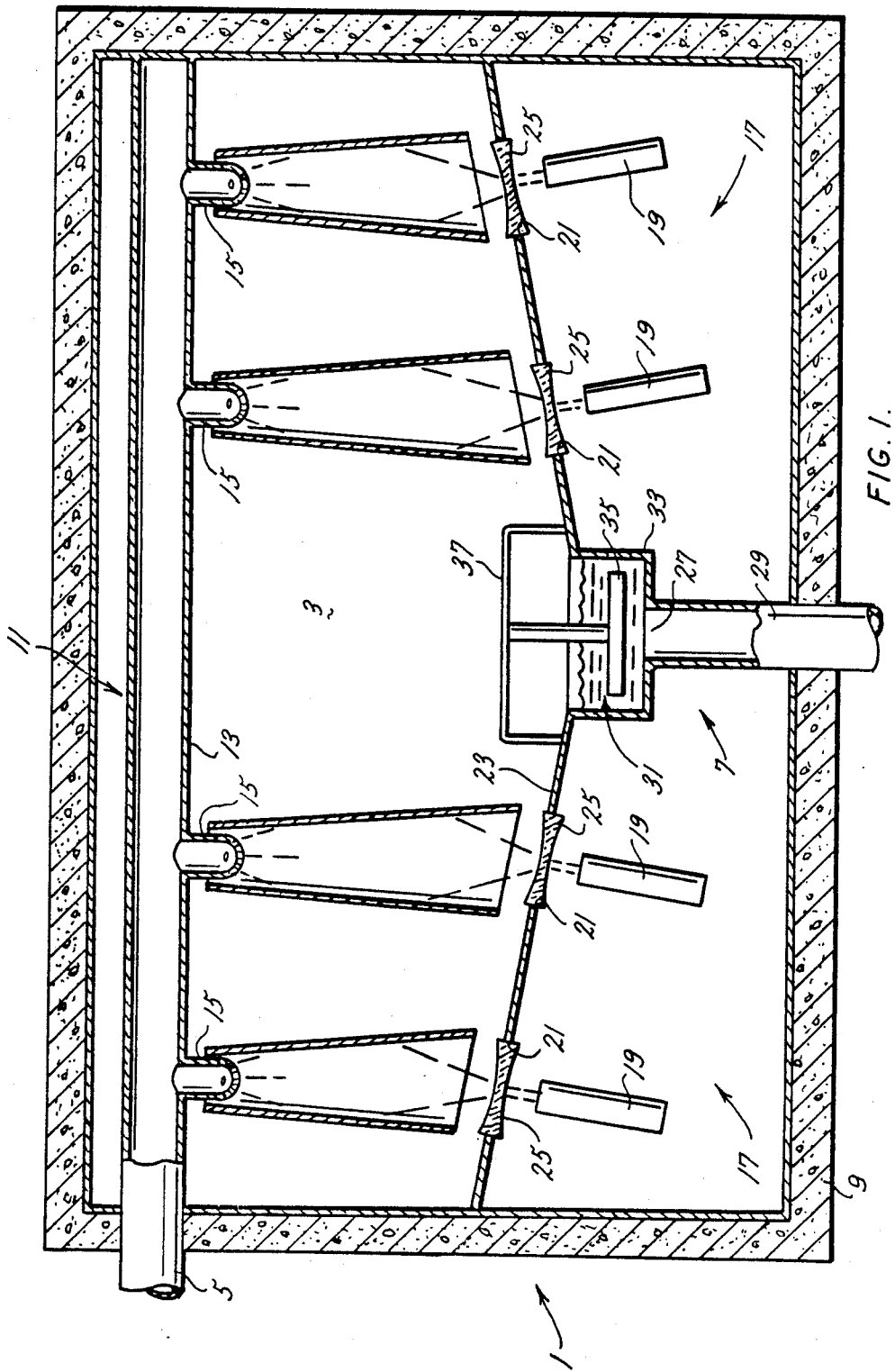
FIG. 1 is a schematic representation of one possible construction of the apparatus of the present invention.

Referring to the drawings, detoxification apparatus for safely disposing of toxic waste material is indicated generally 1. Apparatus 1 is designed to dispose of organic wastes such as polychlorinated biphenyls (PCB's) or dioxin by very high temperature incineration. Since most organic compounds contain hydrogen, carbon and oxygen together with such other elements as nitrogen, sulfur, phosphorus, chlorine, bromine and iodine, highly toxic compounds such as those noted above, can be broken down into safe compounds which are primarily oxides of the other elements listed; i.e., sulfur dioxide ($SO_2$), nitrous oxide ($N_xO_x$), etc.

As shown in the drawings, Apparatus 1 comprises a closed, reactive vessel 3 having at least one inlet 5 and at least one outlet 7. The reactive vessel is constructed of a high-strength alloy such as a titanium steel which has a high melting point and is corrosion resistant. As shown in FIG. 1, vessel 3 may be encased in a layer 9 of reinforced concrete and can be buried underground.

Toxic waste material is introduced into the reactive vessel via an ingress means 11. As shown in FIG. 1, means 11 comprises a waste pipe 13 which traverses the vessel through inlet 5. At least one spray nozzle 15 is fitted to the waste pipe (four such nozzles being shown in FIG. 1) for the waste material to be sprayed into the vessel. Thus the waste material is in a fluid state (a mist) when introduced into the vessel.

A laser means 17 produces a high energy laser beam within the vessel, means 17 including at least one high energy laser 19. As shown in FIG. 1, four high energy lasers (one for each spray nozzle) are positioned outside vessel 3 which has a corresponding aperture 21 in its base wall or floor 23 for the laser beam produced by each laser to enter the vessel. An optical window, which may preferably be a divergent lens 25 is fitted into each aperture; the lens serving to defocus or increase the cross-sectional area of the laser beam entering the vessel.

The spray of waste material ejected through the nozzles pass through the laser beams generated by the lasers. This, in turn, creates very high temperatures within the waste material which incinerates the toxic waste. As the fine particles of the mist sprayed through the laser beams strike floor 23 of the vessel and condense, they run down the floor, which is sloped downwardly toward the center of the vessel to a drain 27. A waste removal pipe 29 is affixed to the drain to carry the detoxified material away for further processing.

To enhance the detoxification process, the bottom on vessel 1, around drain 27 is shaped to form a bath 31 in which the waste material collects. The side walls and floor of the bath are metal and comprise a cathode 33.

An anode 35 which may be of graphite, is suspended from rods 37, which may also be of graphite, into the bath. An electrical current flows between the anode and cathode with the collected waste material serving as the conducting medium. The electrical current which is produced if a high voltage is generated between the anode and cathode electrolyzes the liquid residue from the laser incineration and creates gases which are drawn into the outlet system for further processing. To enhance electrolysis, small amounts of non-metallic salt solutions could be sprayed into the bath.

With the basic apparatus now set forth, other embodiments are now described to introduce various refinements and alternate ways to implement the invention.

Figure 2:
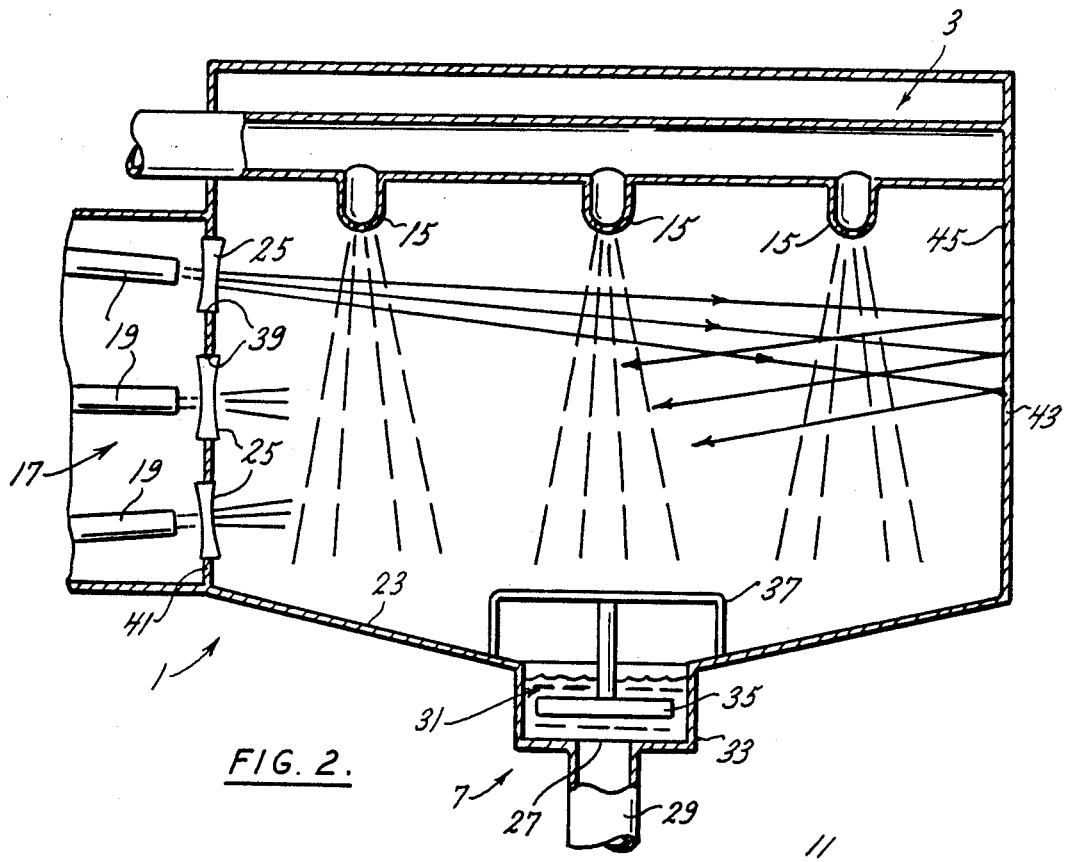
FIG. 2 is a schematic representative of a second possible construction of the apparatus.
Figure 4:
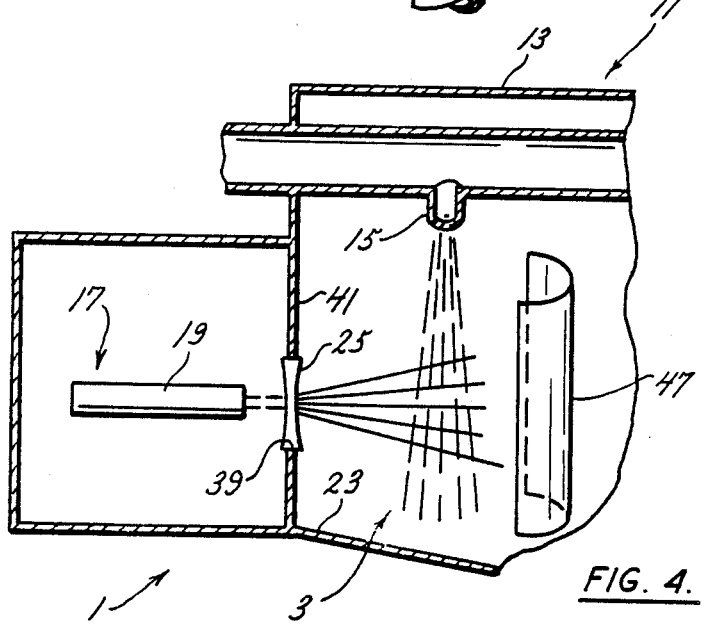
FIG. 4 is a partial schematic representation of a construction similar to that shown in FIG. 2, but utilizing a parabolic reflector.

Referring to FIG. 2, the fine mist spray from nozzles 15 is directed vertically downward toward base wall or floor 23 of vessel 1. Now, however, lasers 19 are positioned outside the vessel and direct their laser beams through lenses 25 which are fitted in apertures 39 in a side wall 41 of the vessel. Three lasers 19 are shown in FIG. 2, with the middle laser directing its beam horizontally across the vessel while the upper and lower lasers are canted so their beams are angled across the vessel. The metal wall 43 opposite the lasers has a highly polished interior surface 45 which acts as mirror and reflects impinging laser beam energy back into the vessel to enhance the incineration process. Surface 45 thus acts as a reflection means for bouncing a laser beam about the interior of the vessel. An alternative to the mirrored surface 45 is shown in FIG. 4, where a parabolic reflector 47 is mounted within the vessel and a laser beam from a laser 19 is directed at the reflector.

Figure 3:
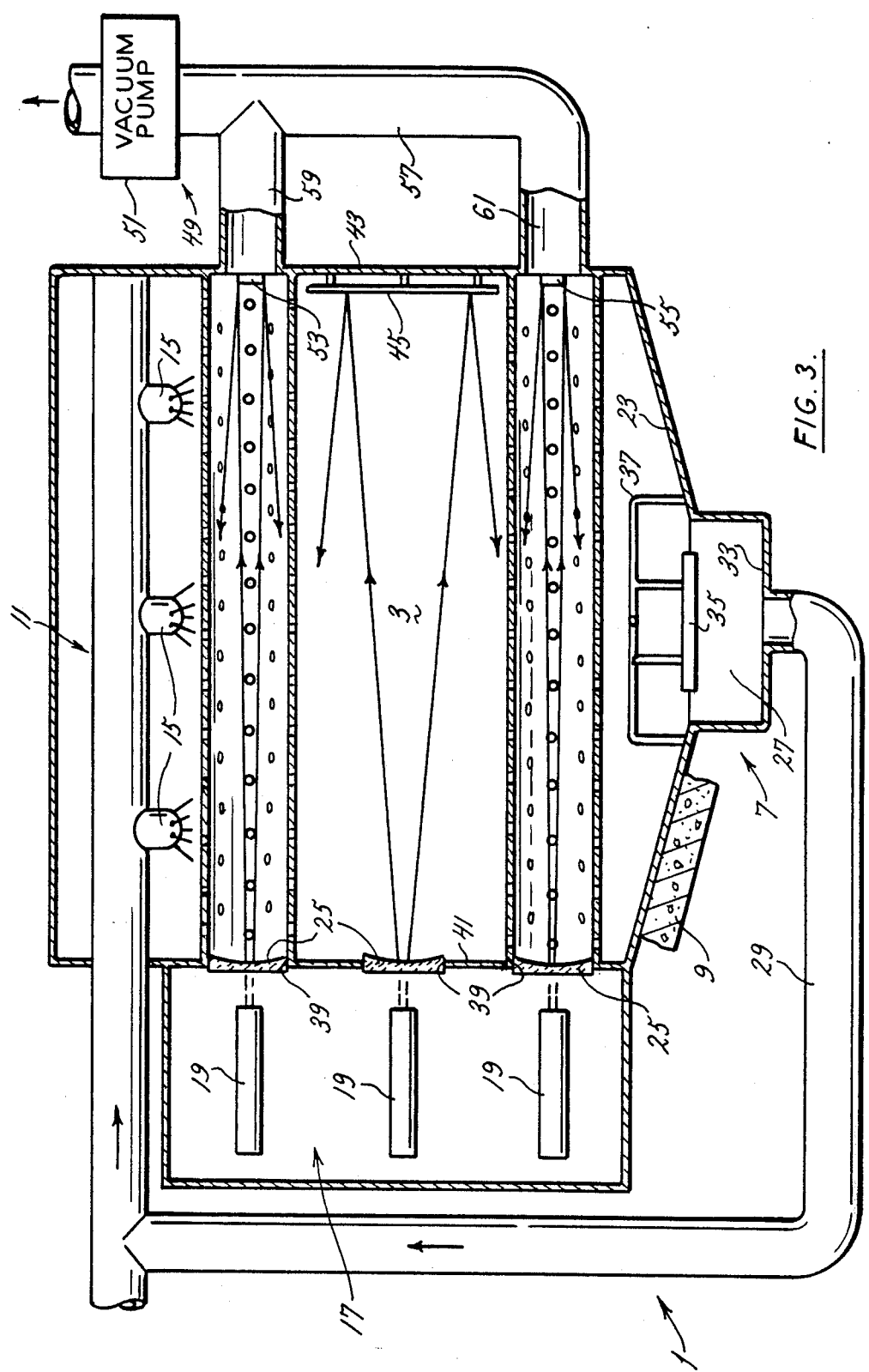
FIG. 3 is a schematic representation of a third possible construction of the apparatus employing a vacuum system.

Referring to FIG. 3, a vacuum means 49 comprises a vacuum pump 51 which is connected to suction ports 53 and 55. These ports are respectively formed in the upper and lower reaches of wall 43 and are connected to the pump via vacuum lines 57, 59 and 61. Of the three lasers 19 shown in FIG. 3, the upper and lower lasers are now aligned so their laser beams are directed at the respective parts 53 and 55. The middle laser has its beam directed at the surrounded surface 45 of the wall. In operation, the suction created by vacuum means 49 draws the toxic particle mist toward ports 53 and 55. Since two of the laser beams are directed at these ports, the amount of incineration is increased because the waste material has a prolonged exposure to the high energy laser beams.

Referring to FIG. 5, apparatus 1A is similar to apparatus 1 previously described except that ingress means 11A comprises a conveyor 63 on which a toxic waste slurry is deposited with the conveyor transporting the waste through reactive vessel 3A. A number of lasers 19A (four being shown in FIG. 5) are positioned above the vessel and direct high energy laser beams onto the material through apertures 65 in the top wall or ceiling 67 of the vessel. Lens 25A fitted into the apertures diverge the laser beams so the beam field substantially covers the width of the conveyor. Waste material falling off the conveyor or condensing on the walls and floor of the vessel drain down to a spill tank 69 formed at the bottom of the tank and are drawn off through drain 27A.

Figure 6:
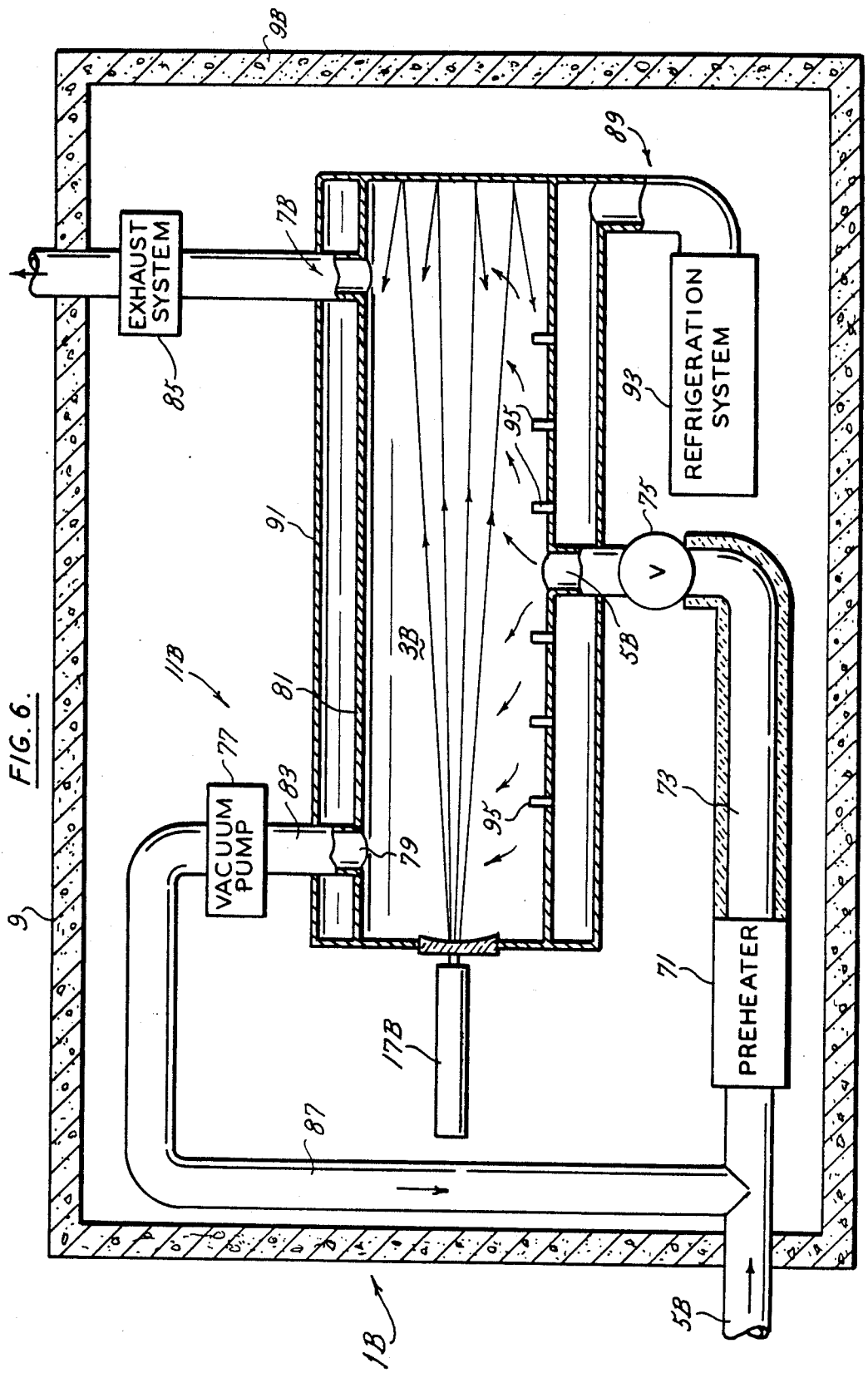
FIG. 6 is a schematic representation of a fifth possible construction of the apparatus; and, FIG. 7 is a schematic representation of another construction of the apparatus utilizing secondary toxic waste treatment.

Another embodiment of the invention is indicated 1B in FIG. 6. As shown, reactive vessel 3B, which is cylindrical, has an inlet 5B connected to a preheater 71 which raises the temperature of the waste material from some nominal temperature. An inlet pipe 73 running from the the preheater to inlet 5B includes an emergency shut-off valve 75 for stopping flow of waste material into the vessel. Ingress means 11B includes a vacuum pump 77 for drawing toxic waste material into the vessel via suction. The pump is connected to a suction port 79 formed in a sidewall 81 of vessel 3B by a pipe 83. A single laser beam is directed down the longitudinal axis of the vessel to incinerate the toxic waste. The outlet 7B of the vessel is connected to waste removing means or exhaust 85 by which the non-toxic waste is transported for disposal. Since some waste material will be pulled out of the vessel through port 79, a feedback pipe 87 is provided between the vacuum pump and the preheater.

Because high temperatures are present within the vessel, it is advisable to cool the sidewalls of the vessel to reduce temperature fatigue in the metal forming the sidewalls. For this purpose, apparatus 1B includes a refrigeration means 89 comprising a jacket 91 encasing the vessel and a refrigeration system 93 for directing a coolant into the jacket. In addition, temperature sensors 95 are located along the inside wall of the vessel to provide a shut down signal to the control system of the apparatus, if the internal vessel temperature exceeds a predetermined level.

Lastly, turing to FIG. 7, apparatus 1C is shown in an integrated system in which solid or liquid toxic waste is transported to a disposal site in a tank car T. The material is pumped from the tank car and dissolved in a combustible and relatively safe solvent such as acetone, ethanol or propylene glycol. The solvent is stored in solvent tank 95 from which it is drawn through an outlet pipe 96 by a vacuum pump 97.

The resultant fluid mixture is pumped by pump 98 to a reactive vessel 3C through a waste pipe 13C. The mixture is sprayed through nozzles 15C into the vessel. A pair of perforated pipes 101 and 103 extend horizontally across the vessel and are connected to a manifold 105. The manifold is connected to a vacuum system 107 which draws the toxic mist sprayed from the nozzles into pipes 101 and 103. A laser system 17C comprises three lasers 19C, two of which are oriented to direct their laser beams down the longitudinal axis of the respective pipes. As previously discussed, this aids incineration of toxic waste. In addition, the third laser is positioned to direct its beam across the lower portion of the vessel to incinerate waste particles not drawn into the pipes. A system of mirrors 109 are used to reflect laser energy throughout the interior of the vessel.

An electrolysis bath 31C is formed at the base of the reactor and anode 35C suspend from rods 37C and cathode 33C are used to produce an electrolyzing current through condensate collecting in the bath. A pump 111 draws residue through drain pipe 29C to feed the remnants back through a feedback pipe 113 to waste pipe 13C.

Waste material drawn through manifold 105 is pulled by a compressor 115 into a second waste pipe 117 for discharge through a nozzle 119 into a second reactive vessel 121. A second laser system 123 includes a laser 125 which directs a high energy laser upward at the spray in a manner similar to that described with respect to FIG. 1. Any remaining material is allowed to be drawn into a solvent bath 127 before being exhausted to the atmosphere through a vent 129.

A computer control 131 is used to operate the overall system. The control includes sensors such as the gas and toxic material sensors 133 positioned in the second reactive vessel to monitor any residual waste. The control also can shut down the system on an emergency basis if vessel temperatures get too high or a malfunction occurs.

I claim as my invention:

1. A method of detoxifying liquid toxic organic waste material by a two step process, the method comprising in a desired order: a first step of subjecting the material to a laser beam by producing a laser beam within a vessel and directing the liquid waste material through the beam as particles, thereby creating sufficiently high temperatures within the material to incinerate the toxic waste, and a second step of electrolyzing said material; and thereafter a step of discharging the detoxified material from the vessel.

2. The method of claim 1 wherein the step of discharging the detoxified material comprises drawing particles by vacuum into an outlet.

3. The method of claim 1 wherein the step of electrolyzing said material is after the step of subjecting the material to a laser beam, the step of electrolyzing comprising condensing particles which have not been incinerated by said laser beam as a liquid and electrolyzing the condensed liquid waste material.

4. The method of claim 3 wherein said step of condensing particles as a liquid and electrolyzing the liquid is carried out in the vessel, and including a step of recycling the electrolyzed liquid waste material into the vessel for repetition of the detoxification.

5. The method of claim 1 wherein the step of subjecting the material to a laser beam includes directing the liquid waste material through the beam as a mist of particles.

6. Detoxification apparatus for safely disposing of liquid toxic organic waste material by a two step process including high temperature incineration and electrolysis, the apparatus comprising: a closed reactive vessel having at least one inlet and at least one outlet; nozzle means for introducing the liquid waste material into the vessel through the inlet as a mist; laser means for producing a laser beam within the vessel, the liquid waste material mist passing through the beam with the beam energy creating sufficiently high temperatures within the waste material mist to incinerate the toxic waste; electrolysis means for electrolyzing the liquid waste material; and egress means for removing detoxified material from the vessel outlet for further processing.

7. The apparatus of claim 6, wherein the egress means comprises vacuum means for drawing mist particles into the outlet.

8. The apparatus of claim 7 wherein the vacuum means comprises a vacuum pump

9. The apparatus of claim 7 wherein the vessel has a floor and wherein the outlet is spaced above the floor.

10. The apparatus of claim 6 wherein the vessel includes a floor and further including a collection bath in the floor for collecting condensed liquid waste material.

11. The apparatus of claim 10 wherein the bath includes the electrolysis means for electrolyzing the condensed liquid waste material.

12. The apparatus of claim 11 including recycling means for recycling condensed liquid waste material from the bath to the inlet to the vessel.

13. The apparatus of claim 10 including recycling means for recycling condensed liquid waste material from the bath to the inlet to the vessel.

14. Detoxification apparatus for safely disposing of toxic waste material by a two step process, the apparatus comprising: a closed reactive vessel having a floor and at least one inlet and at least one outlet; means for introducing the waste material into the vessel through the inlet in the form of particles; laser means for producing a laser beam within the vessel, the particles passing through the beam with the beam energy creating sufficiently high temperatures within the waste material particles to incinerate some of the toxic waste, at least some of the particles condensing to form a liquid on the floor of the vessel; a collection bath in the floor of the vessel for collecting the condensed liquid material, the bath including electrolysis means for electrolyzing the condensed liquid waste material.

15. The apparatus of claim 14 including recycling means for recycling condensed liquid waste material from the bath to the inlet to the vessel.

16. The apparatus of claim 14 further including vacuum assisted egress means above the floor of the vessel for removing detoxified material in a particulate form from the vessel.

* * * * *